May 27, 1941.    W. C. TRAUTMAN    2,243,364
LIQUID PRESSURE REMOTE CONTROL SYSTEM
Filed Oct. 19, 1939
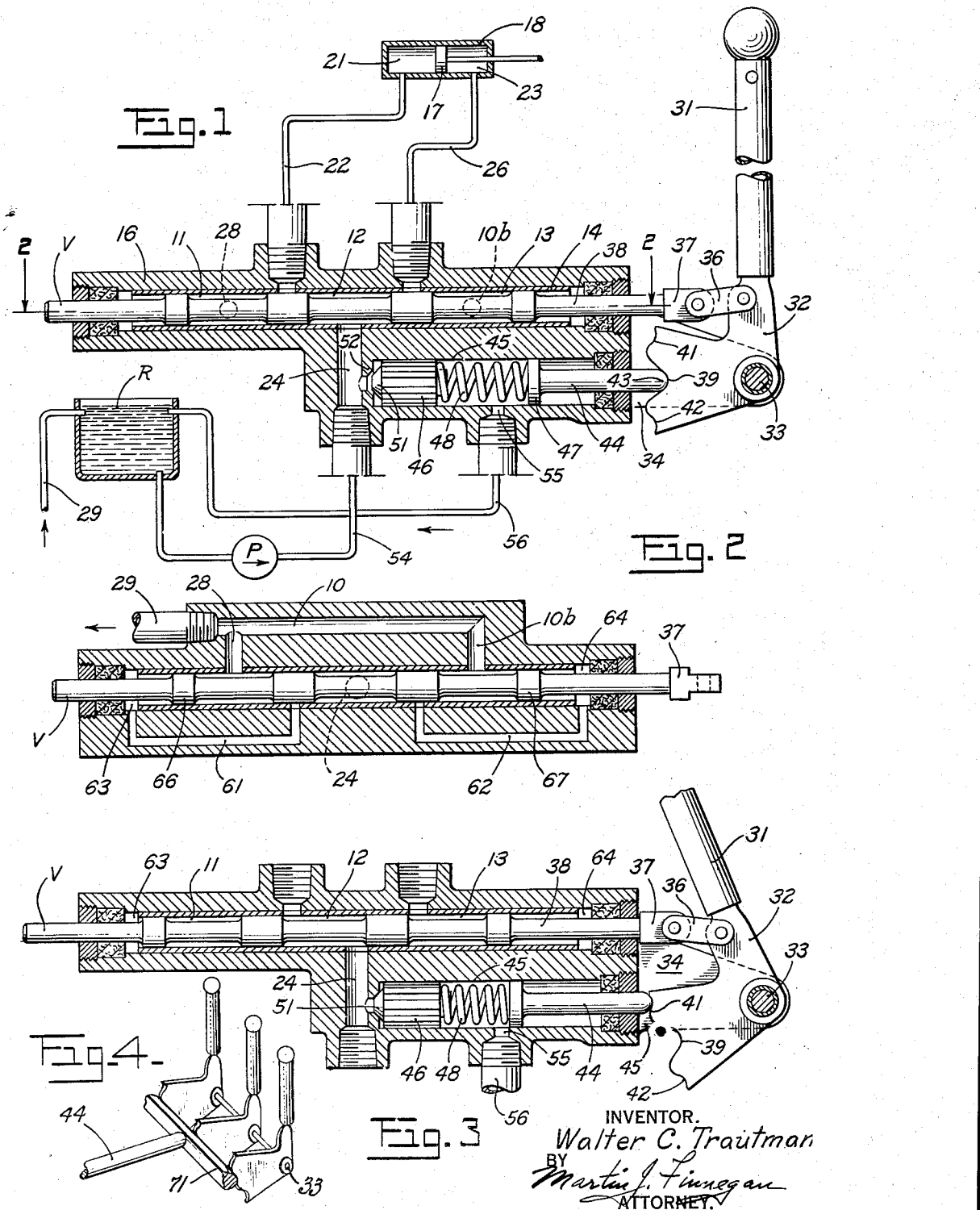
INVENTOR.
Walter C. Trautman
BY Martin J. Finnegan
ATTORNEY.

Patented May 27, 1941

2,243,364

UNITED STATES PATENT OFFICE

2,243,364

LIQUID PRESSURE REMOTE CONTROL SYSTEM

Walter C. Trautman, Los Angeles, Calif., assignor to Bendix Aviation Corporation, South Bend, Ind., a corporation of Delaware Application October 19, 1939, Serial No. 300,258

2 Claims. (Cl. 60—52)

This invention relates to liquid pressure remote control systems and controlling valves therefor and is particularly adapted for but not limited to the operation of landing gear, wing flaps, bomb release devices and the like.

One object of the present invention is to provide an improved controlling valve which is particularly useful in practice, and a liquid pressure remote control system embodying such a valve.

Another object of the invention is to provide a fluid pressure control system wherein a manual valve actuating member may be releasably locked in "on" or open position, and wherein means is provided for automatically bringing the actuating member to the "off" or closed position when the pressure of the fluid admitted through the valve overcomes the resistance of the locking means.

The improved valve which is used for controlling the delivery of liquid from a transmitter pump to a motor unit is arranged so that it is automatically reverted to its "off" condition when the pressure of liquid, fed to the motor unit, exceeds a predetermined value.

The improved arrangement is particularly useful in connection with motor cylinder units, whereof the pistons or equivalents have two main working positions, namely, one at each end of their normal range of movement.

When the control valve is placed in its "on" position, thus placing the motor unit in communication with a continuously operating transmitter pump, the delivery of pressure liquid from the transmitter pump to the motor unit proceeds to change the setting of the latter; and when the usual piston (or equivalent of said motor unit) reaches the end of its permissible movement and is arrested, the subsequent rise in the pressure of the liquid acts upon a pressure-sensitive surface of said controlling valve and causes the latter to be automatically moved to its "off" position.

Thus, the invention provides a control valve for a liquid pressure remote control system incorporating a valve plunger with manual actuating means, and with pressure chambers associated therewith in such manner that an increase in the pressure of the liquid passing through said valve automatically actuates the valve plunger so as to interrupt the supply of pressure liquid to the motor unit, and divert it to a new path leading back to the source and constituting part of a "breathing" circuit in which free circulation occurs as hereinafter described.

The invention further includes a control valve for a liquid pressure remote control system comprising one or more valve plungers, each actuated by a hand lever to control the delivery of pressure liquid from a transmitter pump to a motor unit; the invention being characterized by the fact that, at the end of the permissible stroke of the piston or equivalent of each motor unit, the corresponding valve plunger is returned automatically by the liquid pressure to its "off" position; and, by reason of a mechanical inter-relationship of controls, there is simultaneously established a by-path for free circulation of liquid from the reservoir, and for return thereto; the said by-path being by way of a combination by-pass and excess pressure relief valve, which is adapted to remain open (or open intermittently) for such free circulation during "off" periods, to close during the stroke, or "on" periods, and also to open in the event of excess pressure, even though the control elements have not returned to the "off" position.

Another feature of the invention is the utilization of the above described combination valve as a part of the yieldable locking means by which the manual actuating member for the main valve is releasably locked in "on" or open position.

Other objects and features of the invention and other novel combinations of parts and desirable particular constructions will be apparent from the following description and from the accompanying drawing which show one particular construction embodying the invention, and in which:

Fig. 1 is a view, partly diagrammatic and partly in section, of a system including the novel controls of the present invention;

Fig. 2 is a sectional view along the line 2—2 of Fig. 1;

Fig. 3 is a sectional view of the controls of Fig. 1 when in a different position; and Fig. 4 is a view in perspective suggesting the manner of applying the invention to a series of operating units.

The liquid reservoir is indicated diagrammatically at R, the transmitter pump at P, and the main valve at V. As shown, the main valve has four fluid-tight cylindrical portions or "lands" connected by intermediate cylindrical portions of smaller diameter, forming annular chambers 11, 12, and 13 within the metallic sleeve 14 which lines the upper bore of the housing 16. These chambers are adapted to be connected to one side or the other of the piston 17 of the motor unit 18 in response to a shift of the valve V from the central, or "off" position shown; a shift to the right being effective to connect valve chamber 11 with motor chamber 21 (by way of pipe 22) and at the same time connecting motor chamber 23 with valve chamber 12, whereby liquid under pressure will be supplied to the motor by way of pump P, supply passage 24, valve chamber 12, and delivery conduit 26. Simultaneously liquid returns to the reservoir by way of conduit 22, valve chamber 11, outlet port 28, and return conduit 29.

The actuating and yieldable locking means includes an operating lever 31 and a bell-crank 32 integrated therewith and pivotally mounted, as at 33, in a bracket 34 projecting from valve housing 16. The upper arm of the bell-crank 32 receives links 36 pivotally connecting to the crosshead 37 on one end of valve rod 38, and the lower arm of the bell-crank is provided with a curving surface, whose deepest portion 39 is disposed between two shallower portions 41 and 42. The deeper portion 39 is normally engaged by the rounded end 43 of the stem 44 of a member constituting part of the combination by-pass and excess pressure relief valve assembly hereinabove referred to, and now to be described in greater detail.

The combination by-pass and excess pressure relief valve assembly includes a pair of shiftable elements 46 and 47 and an interposed spring 48, all said parts being movable in the lower bore 45 of the housing, and the element 47 being the head portion of the member which normally engages recess 39, above described, while the element 46 is a co-operating cylindrical part with longitudinally extending grooves, or flutes, and a conical end 51 adapted to register with a correspondingly tapered surface forming a valve seat in the transverse wall 52 in which the bore 45 terminates. With the handle 31 in the position shown in Fig. 1, which is the "off" or neutral position, the spring 48 is in its most extended position, hence opposition to an unseating of valve 51 is at a minimum. This minimum degree of opposition is so selected as to maintain a relatively low pressure in the system, while allowing compensation for small leaks and temperature changes, by permitting occasional unseating of the valve 51 (as indicated in Fig. 1) sufficiently to produce comparatively free circulation of liquid so long as the handle remains in this neutral (Fig. 1) position. The path for such free circulation is exclusive of the chambers of the main valve V, and is traceable as follows: Reservoir R, pump P, conduit 54, the opening in wall 52, the flutes along the cylindrical surface of valve element 46, the spring chamber 45, port 55, and return pipe 56 to the reservoir. This return path 56 may be separate from return path 10B, 10, 29 as shown, or it may be united therewith, as by drilling a hole in the housing to connect chamber 45 with passage 10B. Another advantage derived from this arrangement is that the system is thereby permitted to "breathe" at all times during non-operation of the motor unit 18, to the extent necessary to prevent development of unnecessarily high pressure during such periods of non-use.

In addition to the passages and valve chambers hereinabove described, other passages and chambers are provided as part of the means to automatically return the handle 31 to the neutral position (Fig. 1) after each stroke of the piston 17, thereby overcoming the opposition of the locking force exerted upon bell-crank 32 by spring-pressed plunger 44, which engages one or the other of the depressions 41, 42 when the handle is in either "on" position, of which one is shown in Fig. 3. As shown best in Fig. 2, such additional passages and chambers include the passages 61 and 62 and the annular chambers 63 and 64, the latter being on the outer sides of the lands 66 and 67, respectively, of the main valve V. With the valve V in the position shown in Fig. 3, the pressure existing in chamber 12 is equalized in both directions, longitudinally of the valve; but the pressure fluid delivered at this time to chamber 63, by way of passage 61, is not offset by any opposing pressure. Thus is created a force operating—as soon as it builds up sufficiently, which of course will not be until after piston 17 has completed its stroke—to return valve V to the neutral position, by simultaneously carrying the bell-crank 32 over the hump intervening between depression 41 and the central, larger recess 39.

As hereinabove noted, the valve assembly 51, 46, 47 operates to relieve an excessive pressure, as a safety measure, should the pressure rise above the value at which the main valve V normally becomes effective to return the handle and bell-crank to neutral—as, for example, in the event of interposition of an immovable obstacle in the path of movement of the handle 31, and consequent inability of the valve V to move sufficiently to overcome the locking effect of plunger 44. This excess pressure relief will occur when the pressure on valve surface 51 exceeds the opposing pressure of spring 48 and thereby opens a path for liquid flow back to the reservoir by way of flutes 46, chamber 45, port 55 and conduit 56—that is, the same path as that by which "breathing" of the system occurs during periods of non-operation of the motor 18; such "breathing" action having heretofore been described in detail.

Should any given installation include more than one set of servo-units—hence requiring more than one shiftable plunger valve corresponding to the valve V, such additional valve or valves could be incorporated alongside of valve V in the same housing, each to be provided with its own operating link, cam and handle, corresponding to link 36, cam 32, and handle 31, and each handle to be pivotally mounted on the rockshaft 33 (which is shown cross-hatched to indicate extension thereof to receive such additional handles); but such additional handles would not require any additional pressure relief valves, for the single relief valve and plunger 44 could be made to be operable by and in response to a shifting of any one of said handles, by providing a cross-bar transversely of the end of plunger 44, to be engaged by each of the several cams of the several handles, and shifted inwardly by any one of said cams as it is moved from neutral to one or the other of its "on" position. Such a crossbar (as shown at 71 in Fig. 4) would preferably have a contour corresponding to that of the depressions 41, 42 of the cams, as indicated.

What I claim is:

1. In a fluid pressure system, a work performing unit, a reversing valve in the path of flow of fluid to said work performing unit, said reversing valve having a neutral position and two operating positions, one on each side of said neutral position, a spring-loaded valve operable, when open, as a by-pass with respect to said reversing valve and also with respect to said work performing unit, and manually operable means to actuate said reversing valve and to releasably lock said reversing valve in any one of its positions, and serving also to increase the spring loading to a maximum pressure setting for said by-pass valve, whenever the manually operable means is operated to move said reversing valve to either operating (flow establishing) position.

2. In a fluid pressure control system, a cylindrical chamber, a valve plunger in said chamber to control fluid flow, an actuating member, said valve plunger having operative connection with said actuating member, a cam surface on the actuating member having a central deep notch and a shallower notch arranged at each side of the central notch, a spring-loaded relief valve for the diversion of the pressure fluid from one path to another when the maximum possible pressure is attained, said valve having an operating member cooperating with the said cam surface and engaged in the central notch in the normal position of the actuating member, or in either of said shallower notches in the respective "on" position of said actuating member, and means for directing pressure fluid against said valve plunger in such manner as to cause said cam surface to ride upon the spring loaded relief valve operating member to disengage it from the respective shallower notch and thus unlock the actuating member from its "on" position and engage said spring-loaded relief valve operating member into the deep notch and thus lock the actuating member in the "off" position.

WALTER C. TRAUTMAN